(12) United States Patent
McCarroll et al.

(10) Patent No.: US 11,788,534 B2
(45) Date of Patent: Oct. 17, 2023

(54) AUTOMOTIVE ACCESSORY USING A MAGNETIC FIELD BETWEEN CIRCUMFERENTIALLY SPACED TEETH, A ROTOR BODY AND A PULLEY TO CREATE A SECONDARY TORQUE PATH

(71) Applicant: Hanon Systems EFP Canada Ltd., Concord (CA)

(72) Inventors: Kyle McCarroll, Scarborough (CA); Kyle D. Mills, Etobicoke (CA); Darrell F. Greene, Bradford (CA)

(73) Assignee: Hanon Systems EFP Canada Ltd., Concord (CA)

( * ) Notice: Subject to any disclaimer, the term of this patent is extended or adjusted under 35 U.S.C. 154(b) by 0 days.

(21) Appl. No.: 17/973,612

(22) Filed: Oct. 26, 2022

(65) Prior Publication Data

US 2023/0042094 A1 Feb. 9, 2023

Related U.S. Application Data

(62) Division of application No. 16/838,088, filed on Apr. 2, 2020, now Pat. No. 11,519,415.

(51) Int. Cl.
*F04D 13/06* (2006.01)
*F04D 29/043* (2006.01)
(Continued)

(52) U.S. Cl.
CPC .......... *F04D 13/027* (2013.01); *F04D 13/06* (2013.01); *F04D 29/007* (2013.01);
(Continued)

(58) Field of Classification Search
CPC .................................................. F04D 29/007
See application file for complete search history.

(56) References Cited

U.S. PATENT DOCUMENTS 5,642,797 A * 7/1997 Wall ........................ F16D 27/14
192/84.961
5,996,759 A 12/1999 Aoki et al.
(Continued)

OTHER PUBLICATIONS

"Thermal Management Systems." © Litens Automotive Group. n.d. <https://litens.com/product-category/thermal-management-systems/>. The website appears to disclose a mechanical decoupling device with a coil-wrap clutch. Publication date unknown.
(Continued)

*Primary Examiner* — Nathan C Zollinger
*Assistant Examiner* — Timothy P Solak
(74) *Attorney, Agent, or Firm* — Harness, Dickey & Pierce, P.L.C.

(57) ABSTRACT

An electrically and mechanically driven automotive accessory including a housing, an electric motor, a pulley, and a pulley assist mechanism. The electric motor comprises a stator assembly that is mounted to the housing and a rotating assembly that is mounted to a shaft. The electric motor creates a primary torque flow path that drives rotation of the rotating assembly relative to the stator assembly. The pulley is rotatable relative to the shaft and the rotating assembly. The pulley assist mechanism includes a plurality of circumferentially spaced teeth nested with a conductive body, a rotor body fixedly mounted to the shaft, and an electromagnet that is configured to induce a magnetic field between the circumferentially spaced teeth, the rotor body, and the pulley, which creates a secondary torque flow path between the pulley and the rotor body.

4 Claims, 13 Drawing Sheets

(51) Int. Cl.
*F04D 29/00* (2006.01)
*F04D 13/02* (2006.01)
*F16D 27/02* (2006.01)
*H02K 7/11* (2006.01)
*F04D 15/02* (2006.01)
*F16D 27/14* (2006.01)
*F16D 27/00* (2006.01)

(52) U.S. Cl.
CPC ......... *F04D 29/043* (2013.01); *F16D 27/02* (2013.01); *H02K 7/11* (2013.01); *F04D 15/0281* (2013.01); *F16D 27/14* (2013.01); *F16D 2027/008* (2013.01)

(56) References Cited

U.S. PATENT DOCUMENTS

| | | | |
|---|---|---|---|
| 6,013,966 A | 1/2000 | Fehrenbacher et al. | |
| 6,297,572 B1 | 10/2001 | Sunaga et al. | |
| 7,144,225 B2* | 12/2006 | Boffelli | F01P 5/12 |
| | | | 417/374 |
| 7,573,169 B2 | 8/2009 | Ihle et al. | |
| 2003/0200760 A1* | 10/2003 | Iwanami | F04B 35/002 |
| | | | 62/133 |
| 2007/0090704 A1 | 4/2007 | Chen | |
| 2008/0184945 A1 | 8/2008 | Guala et al. | |
| 2009/0081059 A1* | 3/2009 | Seki | F04D 13/0673 |
| | | | 417/420 |
| 2014/0017073 A1 | 1/2014 | Muizelaar et al. | |
| 2014/0174873 A1* | 6/2014 | Qin | F16D 13/38 |
| | | | 192/66.32 |
| 2014/0227118 A1 | 8/2014 | Kim | |
| 2015/0110653 A1 | 4/2015 | Kim | |
| 2015/0256047 A1 | 9/2015 | Major | |
| 2015/0285137 A1 | 10/2015 | Luetzow et al. | |
| 2016/0061092 A1* | 3/2016 | Sprygada | F04D 15/0022 |
| | | | 123/41.08 |
| 2016/0094099 A1 | 3/2016 | Moritz et al. | |
| 2016/0230767 A1 | 8/2016 | Thompson et al. | |
| 2017/0037853 A1 | 2/2017 | Modica et al. | |
| 2017/0108002 A1 | 4/2017 | Osawa | |

OTHER PUBLICATIONS

"Shaping the future with the electric water pump." © Nidec GPM Group. n.d. <https://www.nidec-gpm.com/en/details-279/shaping-the-future-with-the-electric-water-pump.html>. This site appears to disclose an impeller, that may be pneumatically or electrically activated. Publication date unknown.

"Cooling System Solutions." © Industrie Saleri Italo S.p.A. 2015. <http://originalequipment.saleri.com/index_eng.asp>.

International Search Report and Written Opinion regarding International Application No. PCT/IB2020/053292 dated Jun. 23, 2020.

\* cited by examiner

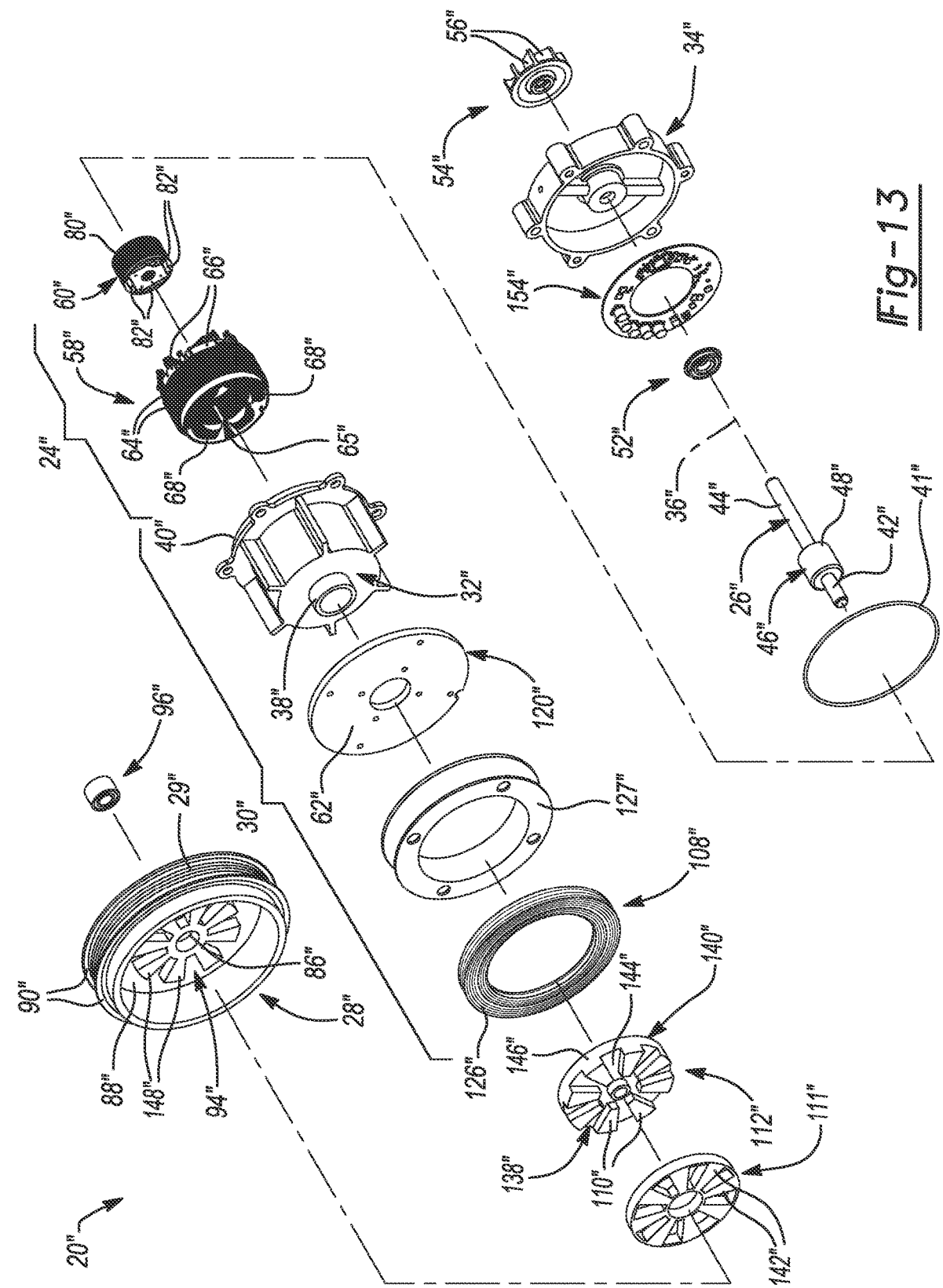

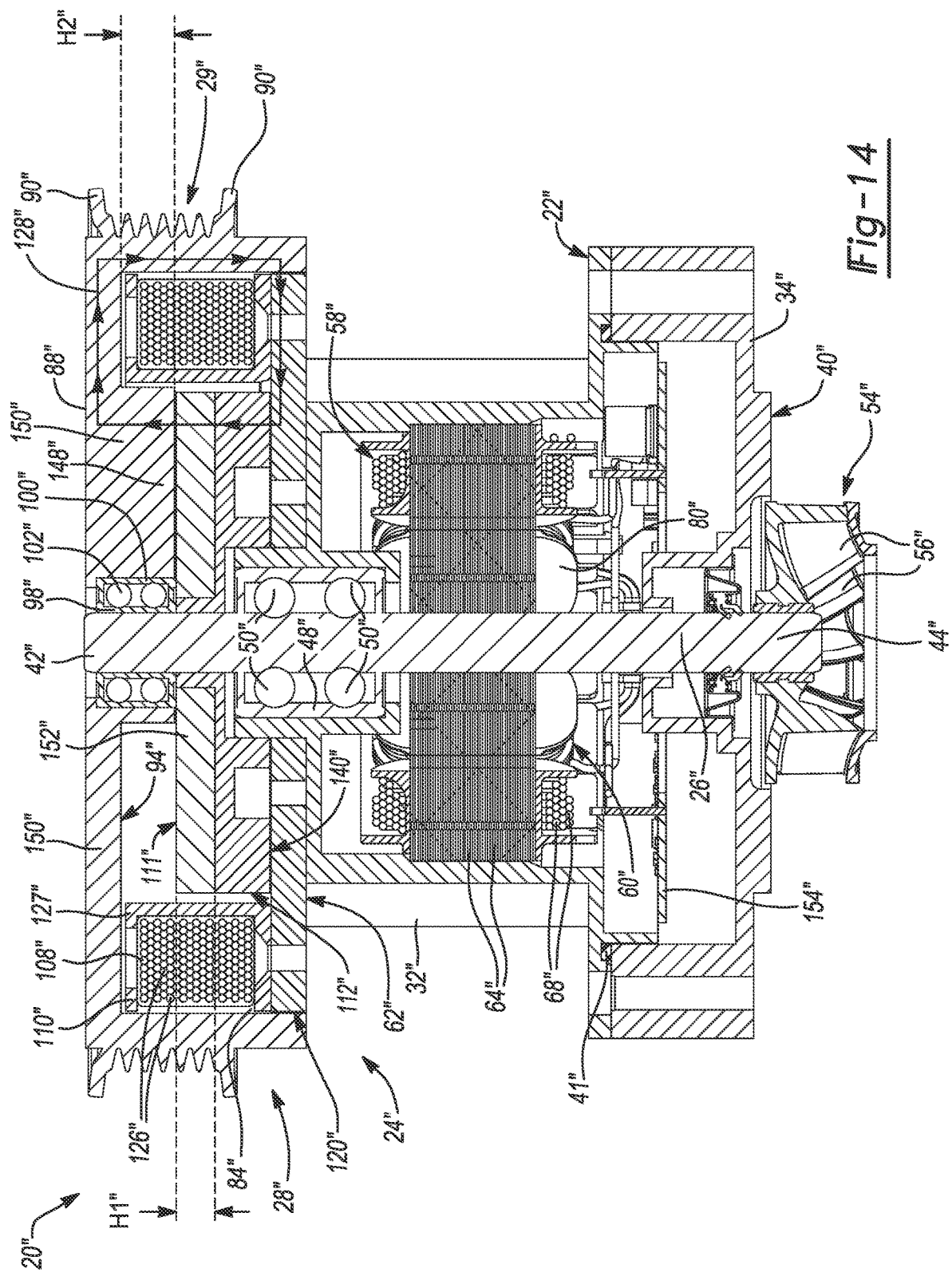

AUTOMOTIVE ACCESSORY USING A MAGNETIC FIELD BETWEEN CIRCUMFERENTIALLY SPACED TEETH, A ROTOR BODY AND A PULLEY TO CREATE A SECONDARY TORQUE PATH

CROSS-REFERENCE TO RELATED APPLICATIONS

The present disclosure is a divisional of U.S. patent application Ser. No. 16/838,088 filed on Apr. 2, 2020, now U.S. Pat. No. 11,519,415 issued Oct. 11, 2022. The entire disclosure of the application referenced above is incorporated herein by reference.

FIELD

The subject disclosure is generally directed to electrically and mechanically driven automotive accessories, including without limitation, electrically and mechanically driven automotive pumps. The subject disclosure is also directed to methods of operating the same.

BACKGROUND

This section provides background information related to the present disclosure which is not necessarily prior art.

Automobiles typically include a variety of different automotive accessories that are either driven by electric motors or driven mechanically off of the engine, and more particularly, off of an accessory belt that is driven by the crankshaft of the engine. Examples include pumps for pumping coolant, oil, transmission fluid, and fuel. Further examples include pumps for pumping engine intake air, which are sometimes referred to as compressors. Mechanically driven automotive accessories suffer from several disadvantages, chief among them being that they cannot be driven when the engine is not running. In addition, the rotational speed and thus the output of mechanically driven automotive accessories is dependent upon engine speed. Therefore, the speed and output of typical mechanically driven automotive accessories cannot be controlled independently of the engine speed.

Electrically driven automotive accessories solve the problems associated with typical mechanically driven automotive accessories, but carry with them their own disadvantages. Most automotive electrical systems generate and run on 12 volts (V) direct current (DC). There are practical limits on the power of electric motors that can be run off of 12 volts (V) direct current (DC) because once a certain power level is exceeded, the heat generated by the electric motor becomes difficult to manage and can cause the electronics to overheat. This makes it difficult to provide an electrically powered automotive accessory capable of delivering an output of 1 kilowatt (kW) while still utilizing a power supply that runs off 12 volts (V) direct current (DC). Accordingly, automobile manufacturers must settle for less powerful electrically driven automotive accessories if they want an automobile accessory that can be driven independently of engine speed and when the engine is not running.

SUMMARY

This section provides a general summary of the disclosure, and is not a comprehensive disclosure of its full scope or all of its features.

In accordance with one aspect of the present disclosure, an electrically and mechanically driven automotive accessory is provided. The electrically and mechanically driven automotive accessory includes a housing, an electric motor configured to rotationally drive a shaft, and a pulley that is rotatable relative to both the electric motor and the shaft. The shaft is rotatably supported in the housing and extends along a longitudinal axis between an input end and an output end. The electric motor comprises a stator assembly and a rotating assembly. When the electric motor is activated, the electric motor creates a primary torque flow path that drives rotation of the rotating assembly relative to the stator assembly. The stator assembly is fixedly mounted to the housing. The rotating assembly is fixedly mounted to the shaft such that the rotating assembly rotates with the shaft. The pulley is rotatably supported on the input end of the shaft such that the pulley is rotatable relative to the shaft and the rotating assembly. The electrically and mechanically driven automotive accessory has a pulley assist mechanism. The pulley assist mechanism includes an electromagnet, a plurality of circumferentially spaced teeth that are nested with a conductive body, and a rotor body that is fixedly mounted to the shaft. When the electromagnet is activated, a magnetic coupling is formed that creates a secondary torque flow path between the pulley and the rotor body due to the magnetic field generated in the pulley, the circumferentially spaced teeth, and the rotor body by the electromagnet.

In accordance with another aspect of the present disclosure, a method of operating the electrically and mechanically driven automotive accessory described above is provided. The method includes the step of applying electricity to electrical windings of the stator assembly to generate an electromagnetic field and a primary torque flow path that rotationally drives the rotating assembly and the shaft. The method also includes the step of rotationally driving the pulley, which is rotatably supported on a pulley bearing assembly. The method further comprises the step of activating the pulley assist mechanism by applying electricity to the electromagnet of the pulley assist mechanism to induce a magnetic field between the pulley, the circumferentially spaced teeth, and the rotor body to create a secondary torque flow path between the pulley and the rotor body.

The secondary torque flow path provided by the pulley assist mechanism adds to the primary torque flow path produced by the electric motor, which allows the shaft to be driven at a higher rotational speed than would otherwise be possible by utilizing only the primary torque flow path. As a result, the electrically and mechanically driven automotive accessory described herein can generate 1.7-1.8 kilowatt (kW) of pumping power, or more, utilizing an electric motor that runs off of 12 volts (V) direct current (DC). Additionally, the electric current supplied to the electrical windings of the stator assembly can be reduced for any given rotational speed when the electromagnet of the pulley assist mechanism is activated. This means that higher rotational speeds and power output are possible while retaining an electric motor that runs on a 12 volt power supply without overheating. The pulley assist mechanism also allows the electric motor to be downsized because peak demand usually coincides with high engine speeds, where the rotational speed of the pulley is high and the pulley assist mechanism is most effective (i.e., when the pulley assist mechanism can provide the largest increase in rotational speed to the rotating assembly).

Unlike mechanically driven automotive accessories, the electrically and mechanically driven automotive accessory described herein can be driven by just the electric motor when the engine of the vehicle is not running. Additionally, the rotational speed of the shaft is fully variable and can be controlled independently of the speed of the engine. The electric current applied to the electromagnet of the pulley assist mechanism can be controlled to vary the degree of magnetic coupling between the pulley and the rotor body. As a result, the amount of torque transfer between the pulley and the rotor body through the secondary torque flow path can be adjusted to control the rotational speed of the shaft as well as the amount of mechanical drag the pulley places on the engine of the vehicle.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 13 is an exploded perspective view of another electrically and mechanically driven automotive accessory that has been constructed in accordance with the teachings of the present disclosure; and FIG. 14 is a side cross-sectional view of the electrically and mechanically driven automotive accessory illustrated in FIG. 13.

DETAILED DESCRIPTION

Figure 1:
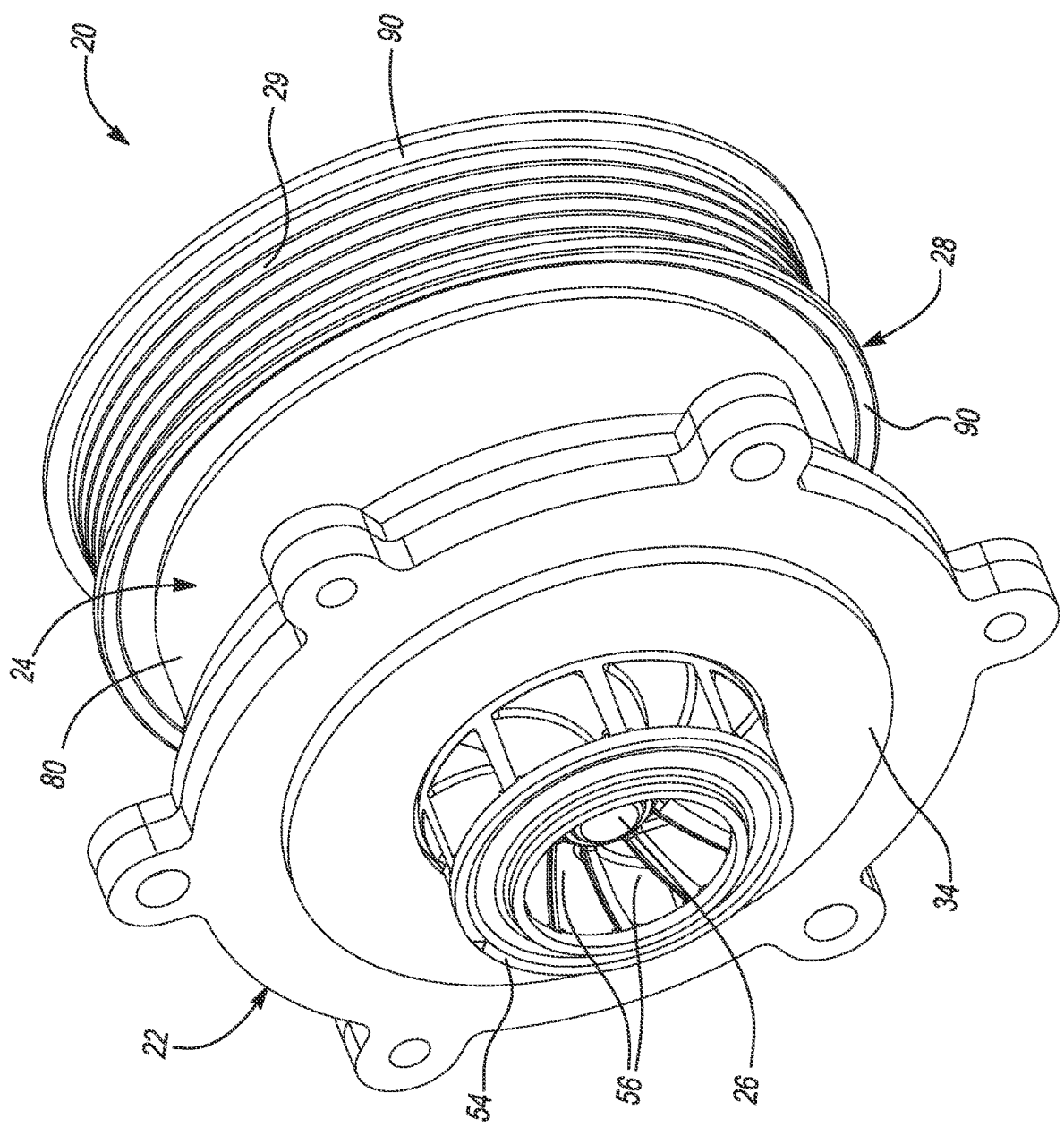
FIG. 1 is a side perspective view of an electrically and mechanically driven automotive accessory that has been constructed in accordance with the teachings of the present disclosure.
Figure 2:
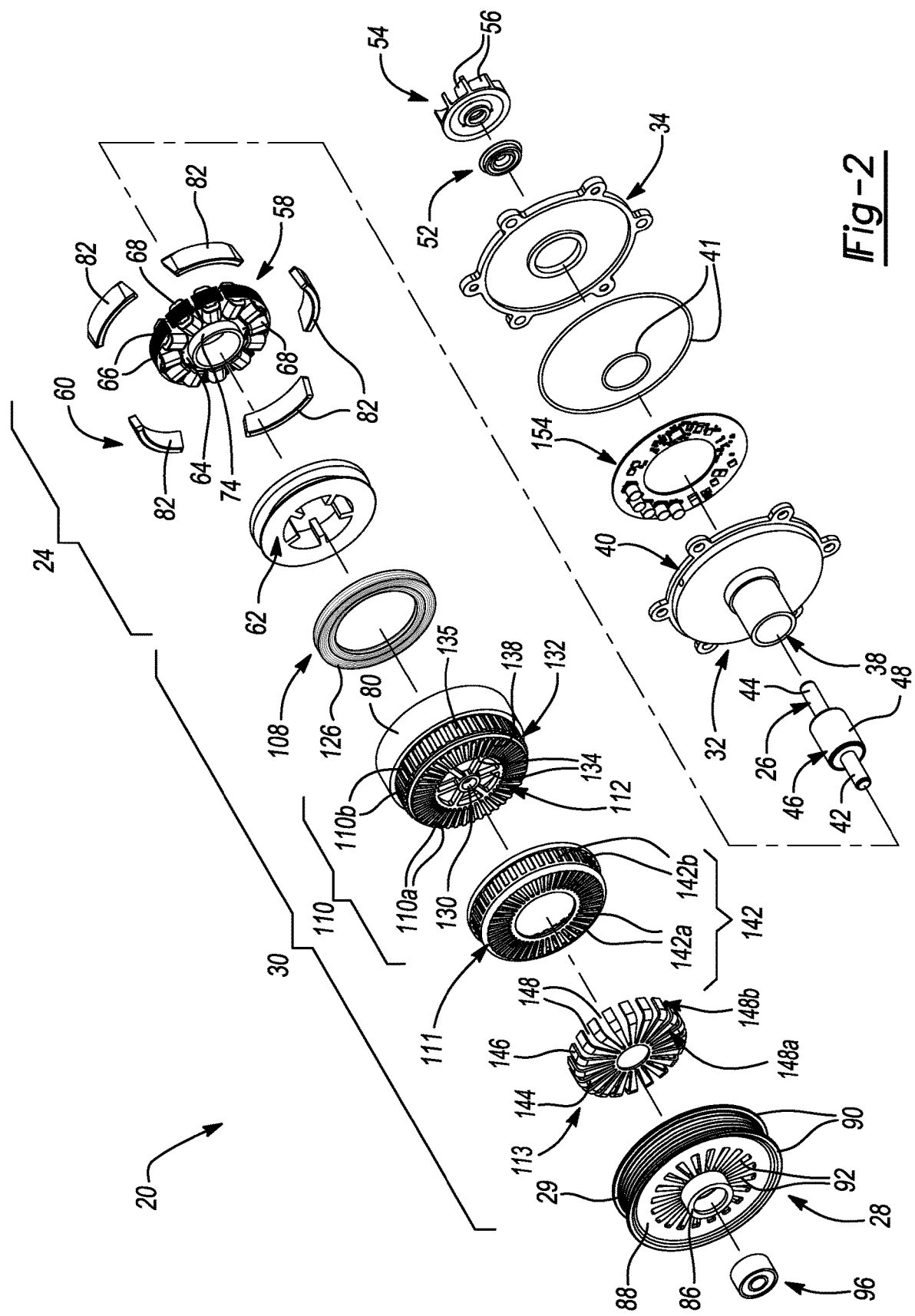
FIG. 2 is an exploded perspective view of the electrically and mechanically driven automotive accessory illustrated in FIG. 1.
Figure 3:
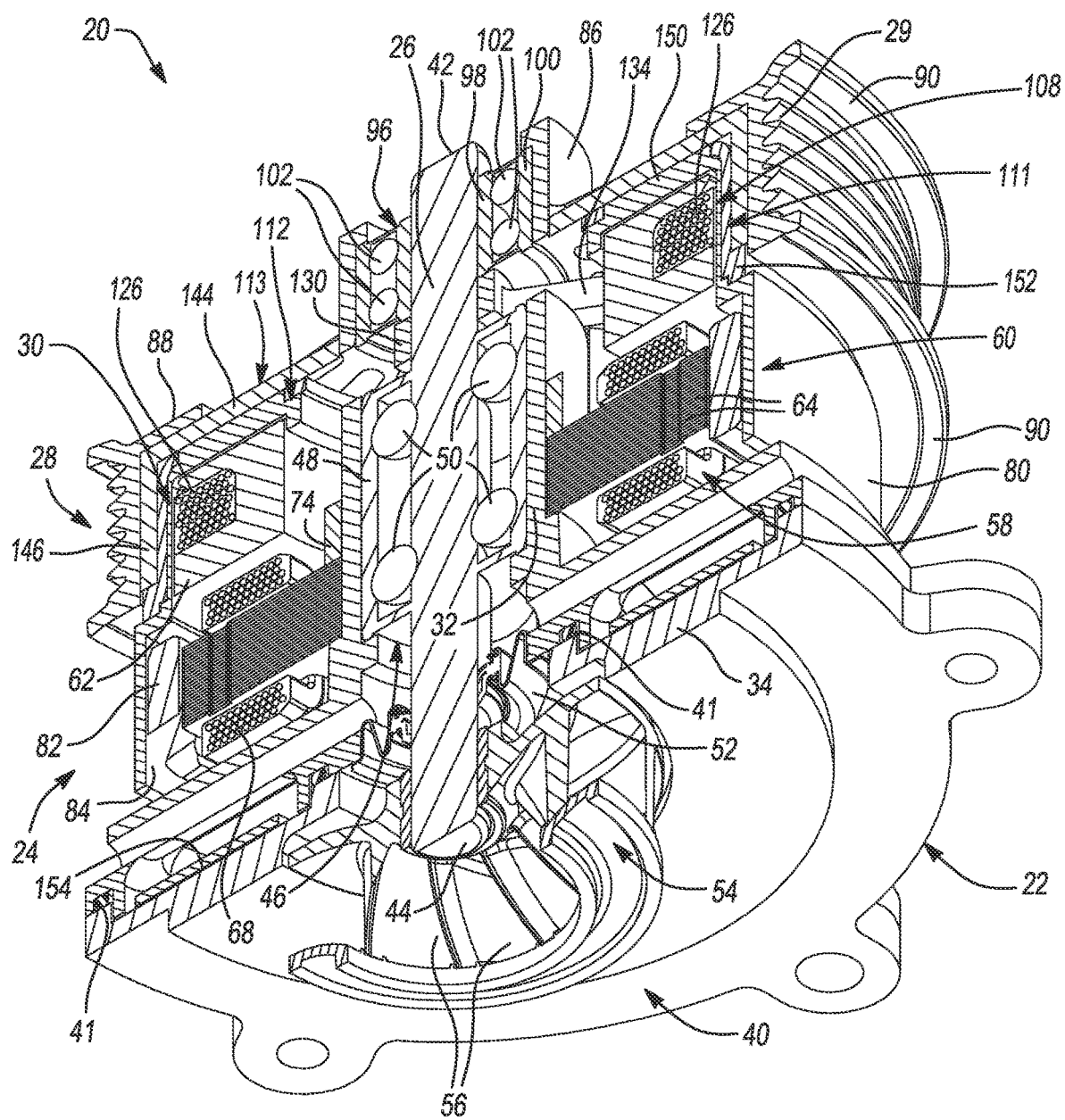
FIG. 3 is a side section view of the electrically and mechanically driven automotive accessory illustrated in FIG. 1.

Referring to the Figures, wherein like numerals indicate corresponding parts throughout the several views, three electrically and mechanically driven automotive accessories 20, 20', 20" are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, the electrically and mechanically driven automotive accessory 20 disclosed herein includes a housing 22, an electric motor 24 configured to rotationally drive a shaft 26, and a pulley 28 that is rotatable relative to both the electric motor 24 and the shaft 26. The pulley 28 may include a belt contact surface 29 in configurations where the pulley 28 is configured to be rotationally driven by a belt (not shown), such as a rubber accessory belt, that is driven by an engine (not shown). The belt contact surface 29 of the pulley 28 engages the belt and may optionally include a channel with grooves. Alternatively, the pulley 28 may be rotationally driven by a gear or a shaft that is powered by the engine. The engine may be, without limitation, an internal combustion engine powering a vehicle (not shown). As will be explained in greater detail below, the electrically and mechanically driven automotive accessory 20 includes a pulley assist mechanism 30 that utilizes electromagnetism to transfer torque from the pulley 28 to the shaft 26 to provide a torque assist (i.e., a mechanical boost) to the electric motor 24 under certain operating conditions.

In the embodiment shown in FIGS. 1-6, the housing 22 includes a tubular portion 32 and a flange portion 34 that mate with one another and give the housing 22 a split, clam-shell like arrangement. The tubular portion 32 extends annularly about a longitudinal axis 36 between a first housing end 38 and a second housing end 40. The flange portion 34 mates to the tubular portion 32 at the second housing end 40. One of more seals 41 are disposed between the tubular portion 32 and the flange portion 34 of the housing 22. The shaft 26 of the electrically and mechanically driven automotive accessory 20 is received in the tubular portion 32 of the housing 22. The shaft 26 extends along the longitudinal axis 36 between an input end 42 and an output end 44. It should therefore be appreciated that the term "longitudinal" used herein describes directions and structures that are parallel or co-axial to the longitudinal axis 36, that the term "radial" as used herein describes directions and structures that extend radially towards and away from the longitudinal axis 36 at a transverse angle relative to the longitudinal axis 36, and that the term "circumferentially spaced" as used herein described structures that are spaced apart along different radians (degrees) relative to the longitudinal axis 36 like the numbers on a clock.

The shaft 26 is longer than the tubular portion 32 of the housing 22 such that the input end 42 of the shaft 26 extends out from the first housing end 38 and the output end 44 of the shaft 26 extends out from the second housing end 40. The shaft 26 is rotatably supported in the tubular portion 32 of the housing 22 by a shaft bearing assembly 46. Although other configurations are possible, the shaft bearing assembly 46 may have an integrated shaft bearing arrangement with an outer sleeve 48 that is press fit into the tubular portion 32 of the housing 22 and two longitudinally spaced ball bearing packs 50 that are positioned radially between the shaft 26 and the outer sleeve 48. During operation, the housing 22 may remain stationary while the shaft bearing assembly 46 allows the shaft 26 to rotate co-axially about the longitudinal axis 36 and relative to the housing 22.

Both the housing 22 and the shaft 26 may be made of a wide variety of different materials, including without limitation, various metals. Optionally, a shaft seal 52, extending annularly about the shaft 26, may be provided adjacent to the output end 44 of the shaft 26. In the illustrated example, the shaft seal 52 is made of a resilient material and is positioned radially between the shaft 26 and the housing 22. The shaft seal 52 in this example is fixed to the housing 22 such that the shaft 26 rotates relative to the shaft seal 52; however, in an alternative embodiment, the shaft seal 52 may be fixed to the shaft 26 such that it rotates with the shaft 26 and relative to the stationary housing 22.

In the illustrated example, the electrically and mechanically driven automotive accessory 20 is a fluid pump, such as a pump for pumping liquid. Such liquids may include, but are not limited to, water, coolant, oil, transmission fluid, or fuel. In accordance with this embodiment, the electrically and mechanically driven automotive accessory 20 includes an impeller 54 that is fixedly mounted to the output end 44 of the shaft 26. The impeller 54 includes one or more vanes 56. The impeller 54 can be made of a wide range of materials, including without limitation, injection molded plastic. During operation, the impeller 54 rotates with the shaft 26, which causes the vanes 56 of the impeller 54 to pump liquid through the fluid pump. However, it should be appreciated that the scope of the present disclosure is not limited to liquid pumps. For example, the electrically and mechanically driven automotive accessory 20 may be configured as an air pump (also known as an air compressor). In other non-limiting examples, the electrically and mechanically driven automotive accessory 20 could also be other automotive accessories that are typically driven by an electric motor, an accessory belt off the engine, the serpentine belt of the engine, the crankshaft of the engine, or a camshaft of the engine.

The electric motor 24 of the electrically and mechanically driven automotive accessory 20 is configured to create a primary torque flow path that drives rotation of the shaft 26 when the electric motor 24 is activated. Although other configurations are possible, the electric motor 24 in the illustrated embodiment comprises a stator assembly 58 and a rotating assembly 60. The rotating assembly 60 is rotatable relative to the stator assembly 58 about the longitudinal axis 36. The stator assembly 58 is fixedly mounted on the tubular portion 32 of the housing 22 and therefore remains stationary during operation. The electrically and mechanically driven automotive accessory 20 includes a stationary backing member 62 and the stator assembly 58 includes a plurality of stator plates 64, all of which are fixedly mounted on the tubular portion 32 of the housing 22. The stator plates 64 are stacked together and include a plurality of arms 66 that support electrical windings 68. Although other configurations are possible, in the illustrated embodiment, the stator plates 64 are made of metal and the electrical windings 68 are made of copper wire. The stator plates 64 and the electrical windings 68 may also be encased in a resin or a plastic to protect them from corrosion/oxidation, vibration, contaminants, and impact damage and to structurally unitize the stator assembly 58.

The stationary backing member 62 includes a plurality of spokes 70 that are fixedly mounted to the tubular portion 32 of the housing 22 via a press fit and an annular portion 72 that is positioned radially outward of the tubular portion 32 of the housing 22. The plurality of spokes 70 extend radially outwardly from the tubular potion 32 of the housing 22 to the annular portion 72. A spacer 74 is positioned on the tubular portion 32 of the housing 22 between the stationary backing member 62 and the stator plates 64 to maintain the longitudinal spacing of these components. The rotating assembly 60 includes a rotating backing member 80. The rotating backing member 80 extends circumferentially about at least a portion of the stator assembly 58. It should be appreciated that the words "stationary" and "rotating" used to describe the backing members 62, 80 are merely used for labelling purposes and refer to the relative motion between these two components when the electric motor 24 is running.

Permanent magnets 82 are fixedly mounted to the rotating backing member 80 and are spaced radially outward of the stator plates 64. When electricity (i.e., electric current) is applied to the electrical windings 68 of the stator assembly 58, an electromagnetic field is created that interacts with the magnetic field of the permanent magnets 82, which causes the rotating backing member 80 to rotate. Although other configurations are possible, the stationary backing member 62 and the rotating backing member 80 may be made of a ferrous metal material and the permanent magnets 82 of the rotating assembly 60 may be made of a ferritic material or rare earth materials, such as samarium cobalt (SmCo) or neodymium-iron boron (NdFeB), and may be glued to an inside surface 84 of the rotating backing member 80.

The pulley 28 is rotatably supported on the input end 42 of the shaft 26 such that the pulley 28 is rotatable relative to the shaft 26 and the rotating assembly 60. In the illustrated example, the pulley 28 has a hub portion 86, a pulley wall 88, and two annular rims 90. The pulley wall 88 extends radially outwardly from the hub portion 86 and the belt contact surface 29 is positioned between the two annular rims 90. The belt contact surface 29 is configured to mate with (i.e., contact) the belt (not shown), while the two annular rims 90 of the pulley 28 are configured to help prevent the belt from sliding/jumping off of the pulley 28. The pulley wall 88 may optionally include a plurality of radially extending slots 92 to save weight. The pulley 28 is supported by a pulley bearing assembly 96 that is positioned radially between the input end 42 of the shaft 26 and the hub portion 86 of the pulley 28. Although other configurations are possible, in the illustrated embodiment, the pulley bearing assembly 96 includes an inner race 98 that is press fit on the input end 42 of the shaft 26, an outer race 100 that is press fit into the hub portion 86 of the pulley 28, and a plurality of ball bearings 102 that are positioned radially between the inner and outer races 98, 100. As a result, the pulley 28 can rotate relative to the shaft 26 and the rotating assembly 60, which can rotate independently of the pulley 28.

Figure 4:
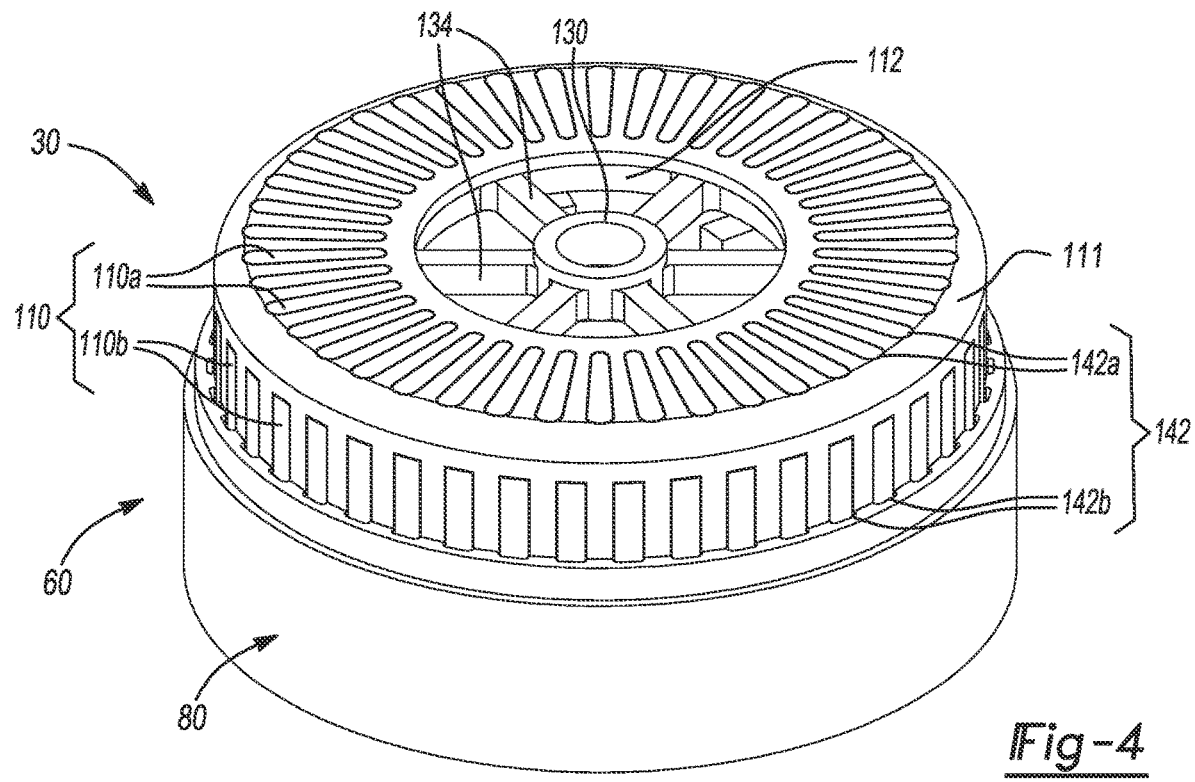
FIG. 4 is a side perspective view of an exemplary rotating assembly of the electrically and mechanically driven automotive accessory illustrated in FIG. 1.
Figure 5:
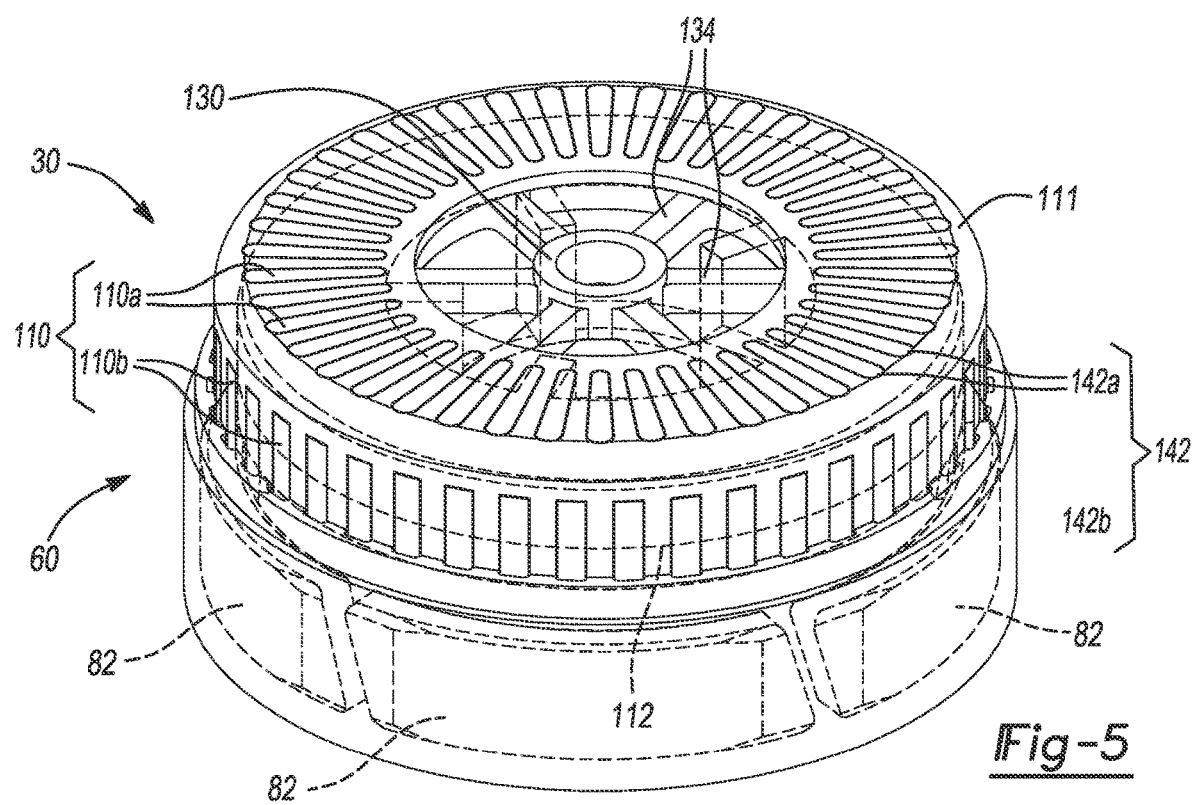
FIG. 5 is another side perspective view of the rotating assembly illustrated in FIG. 4, where the internal components of the rotating assembly are shown in dashed lines.

The pulley assist mechanism 30 includes an electromagnet 108 that is supported on the stationary backing member 62. More specifically, the stationary backing member 62 is a bobbin that supports the electromagnet 108. For example, in the illustrated embodiment, the electromagnet 108 is a wire coil 126 of copper wire that is wound about the stationary backing member 62. The pulley assist mechanism 30 further includes a plurality of circumferentially spaced teeth 110 that are nested with a conductive body 111, a rotor body 112 that is fixedly mounted to the shaft 26, and a claw body 113 that is fixed with the pulley 28. The rotor body 112 rotatably couples the rotating backing member 80 to the shaft 26. As a result, the rotating backing member 80 and the rotor body 112 always rotate at the same rotational speed as the shaft 26, while the claw body 113 always rotates at the same rotational speed as the pulley 28, which may be different than the rotational speed of the shaft 26. In this embodiment of the pulley assist mechanism 30, both the circumferentially spaced teeth 110 and the conductive body 111 are fixed to the rotor body 112. For example, as shown in FIGS. 4 and 5, the circumferentially spaced teeth 110 are integral with the rotor body 112 while the conductive body 111 is press fit onto the rotor body 112, although other configurations may be possible.

The rotor body 112 includes a hub segment 130 that is press fit onto the shaft 26 and an annular segment 132 that is connected to the hub segment 130 by radially extending spokes 134. The annular segment 132 has a ring-like shape and includes an outer diameter face 135, an inner diameter face 136 opposite the outer diameter face 135, a first side face 138 that faces the pulley 28 and a second side face 140 opposite the first side face 138. The plurality of circumferentially spaced teeth 110 include a first set of teeth 110a that extend lengthwise in a plurality of radial directions (i.e., in directions transverse to the longitudinal axis 36) and a second set of teeth 110b that extend lengthwise in a plurality of longitudinal directions (i.e., in directions parallel to the longitudinal axis 36). The first set of teeth 110a protrude longitudinally from the first side face 138 of the rotor body 112 at a first height H1 and the second set of teeth 110b protrude radially from the outer diameter face 135 of the rotor body 112 at a second height H2. The circumferentially spaced teeth 110 extend through a plurality of openings 142 in the conductive body 111. More specifically, the plurality of openings 142 in the conductive body 111 include a first set of openings 142a that receive the first set of teeth 110a and a second set of openings 142b that receive the second set of teeth 110b. As a result, the features of the conductive body 111 nest with the features of the rotor body 112.

The claw body 113 is positioned between the pulley 28 and the rotor body 112. The claw body 113 includes a radial portion 144 that extends radially outwardly from the pulley bearing assembly 96 to a longitudinal portion 146. The claw body 113 is fixed with the pulley 28 by a press fit such that the claw body 113 and the pulley 28 both rotate at the same rotational speed. The claw body 113 includes a plurality of circumferentially spaced slots 148, which give the claw body 113 a cage-like structure made up of a plurality of circumferentially spaced fingers. Each slot 148 is bi-axial and has a radial component 148a that is in plane with the radial portion 144 of the claw body 113 and transverse to the longitudinal axis 36 and a longitudinal component 148b that is in plane with the longitudinal portion 146 of the claw body 113 and parallel to and spaced from the longitudinal axis 36. The radial component 148a and longitudinal component 148b of each slot 148 are contiguous. Further, the radial component 148a of each slot 148 is closed at one end while the longitudinal component 148b of each slot 148 is open at one end.

Figure 6:
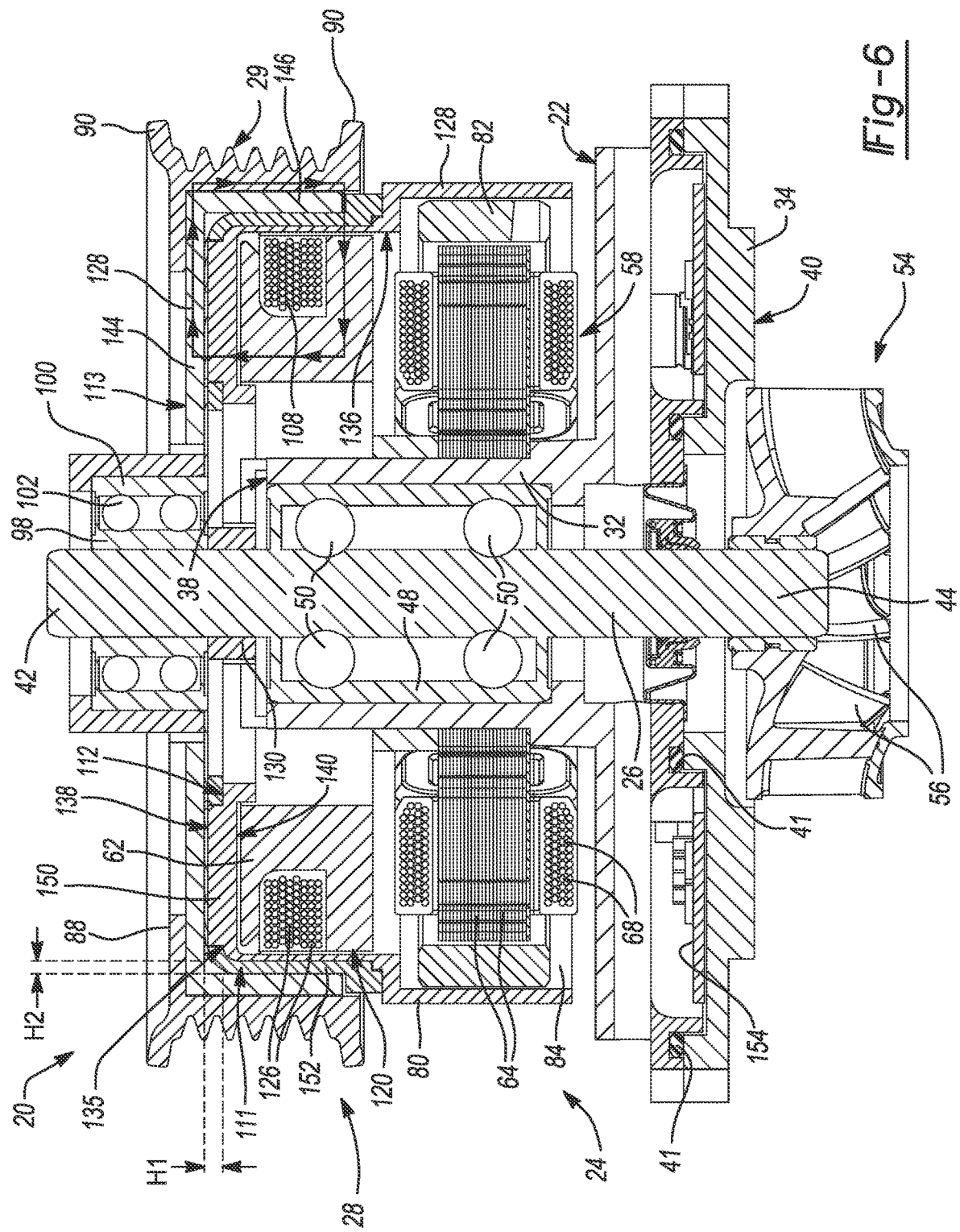
FIG. 6 is a side cross-sectional view of the electrically and mechanically driven automotive accessory illustrated in FIG. 1.
Figure 7:
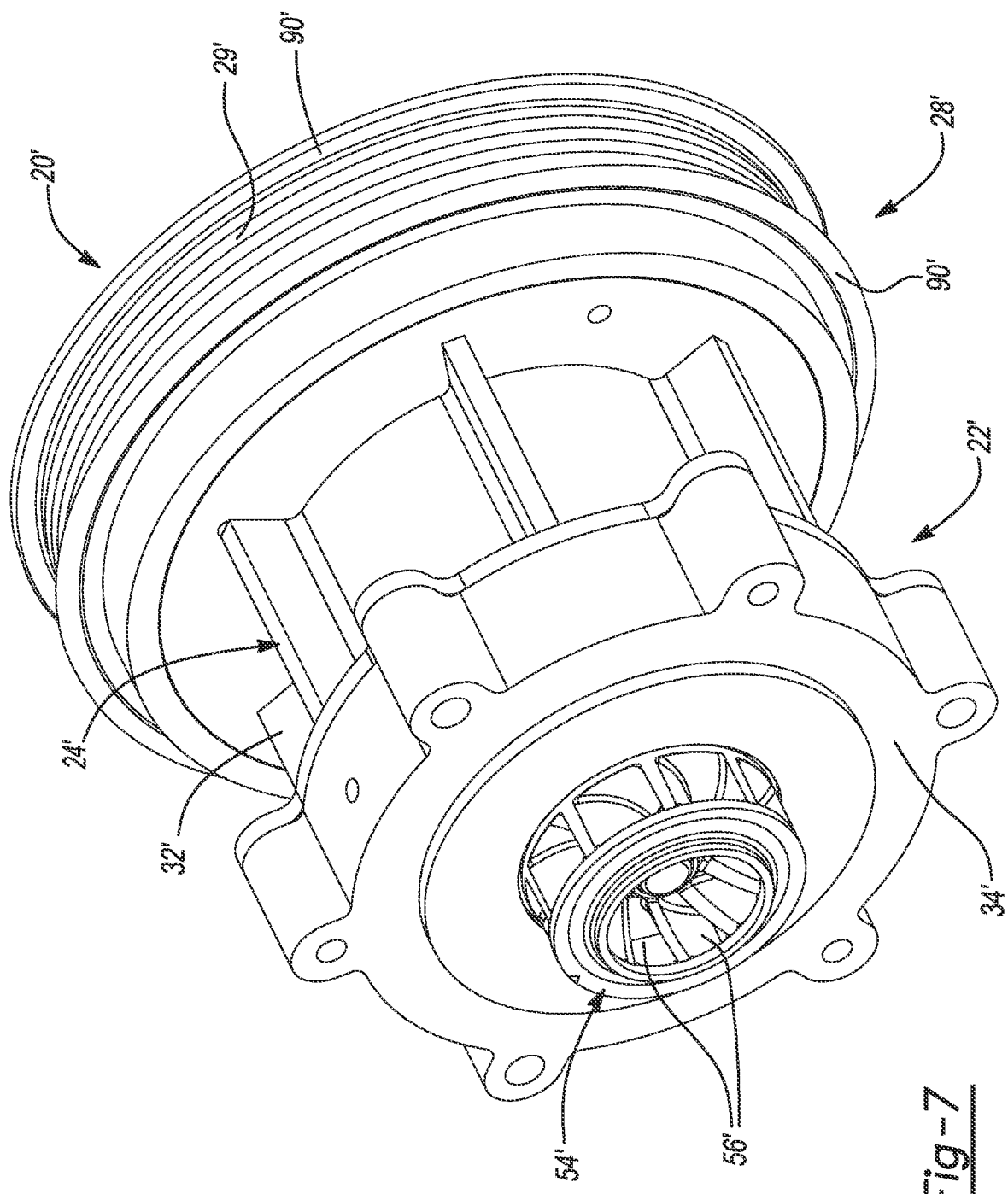
FIG. 7 is a side perspective view of another electrically and mechanically driven automotive accessory that has been constructed in accordance with the teachings of the present disclosure.
Figure 8:
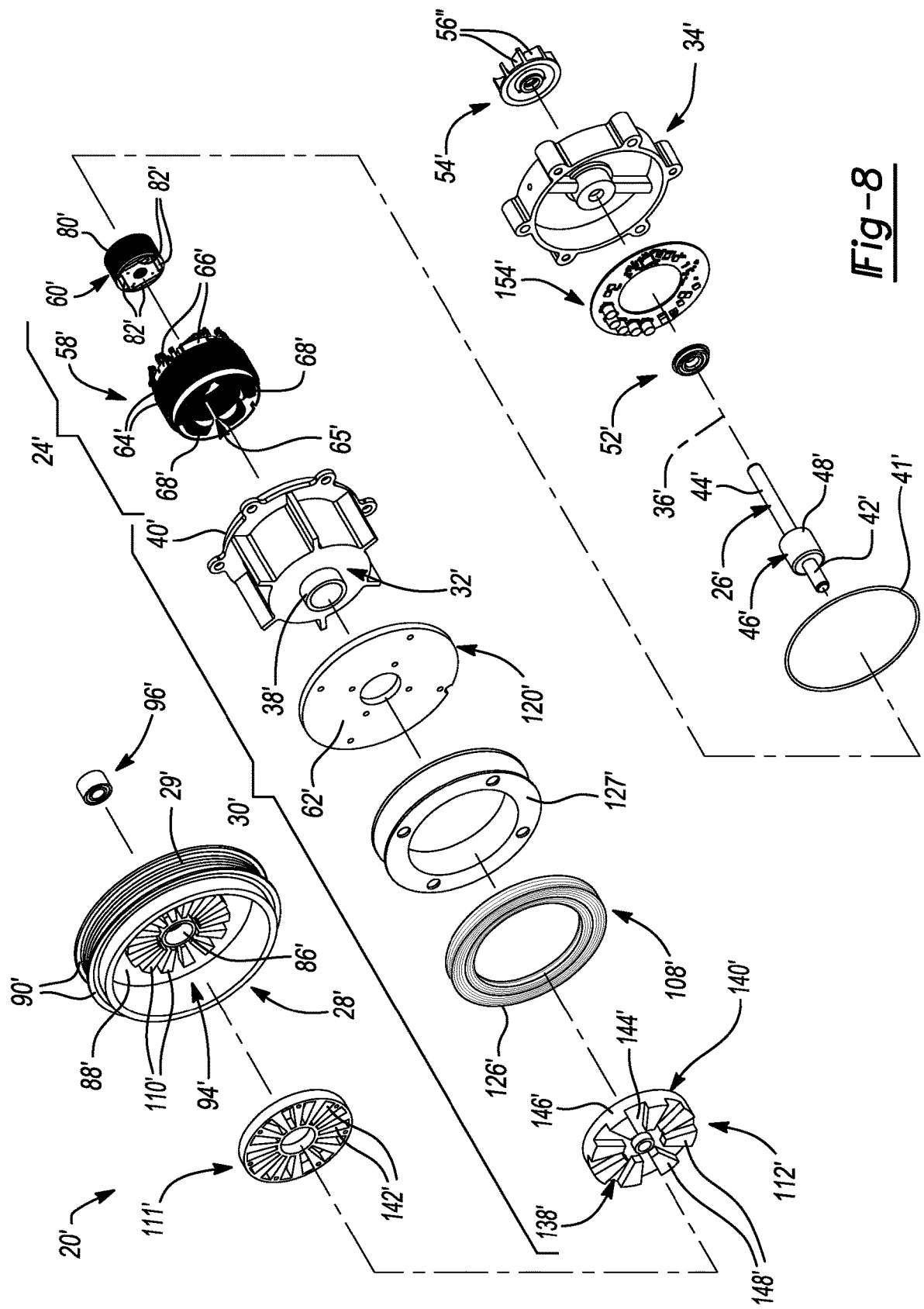
FIG. 8 is an exploded perspective view of the electrically and mechanically driven automotive accessory illustrated in FIG. 7.
Figure 9:
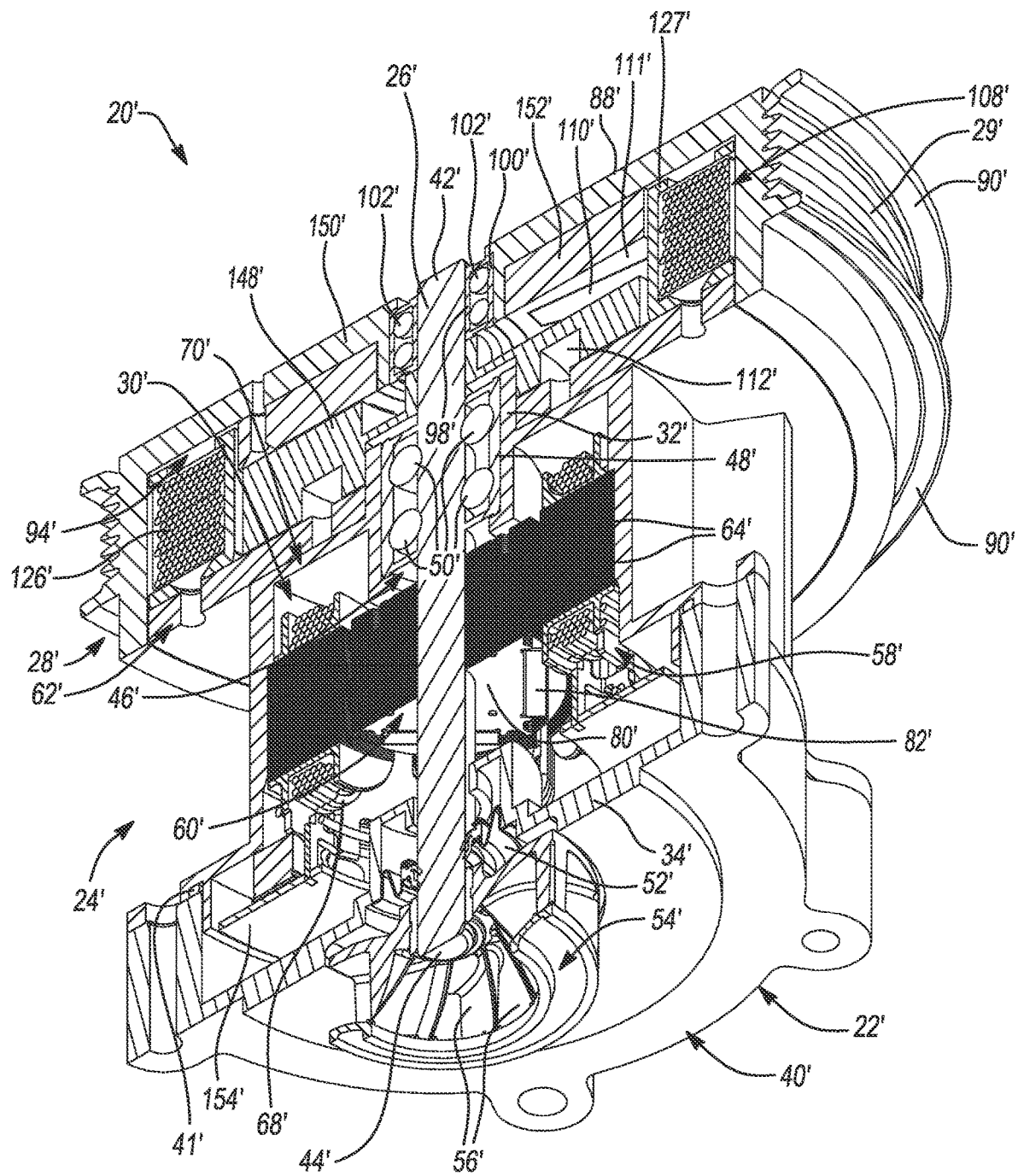
FIG. 9 is a side section view of the electrically and mechanically driven automotive accessory illustrated in FIG. 7.
Figure 10:
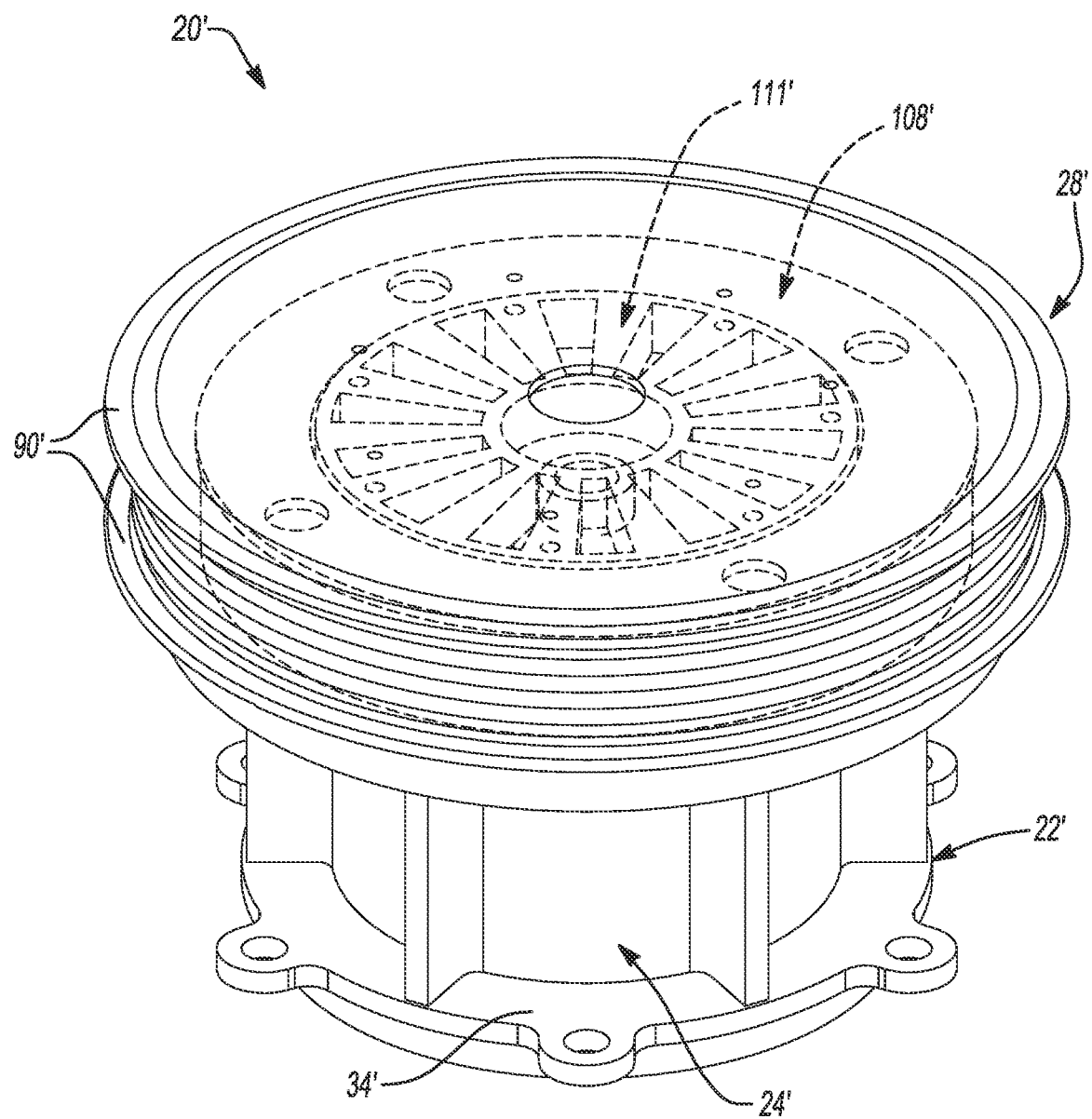
FIG. 10 is a side perspective view of the electrically and mechanically driven automotive accessory illustrated in FIG. 7.
Figure 11:
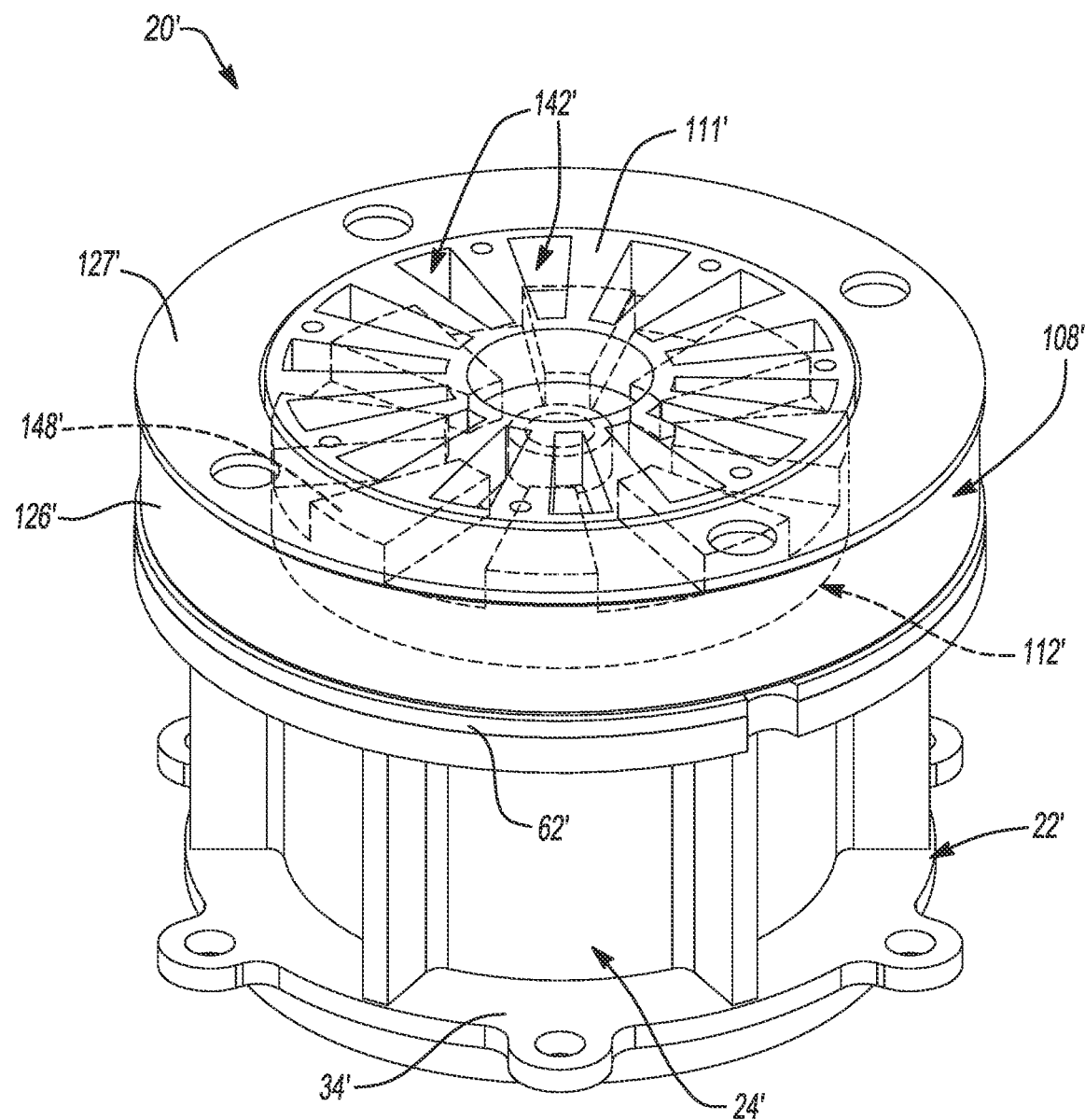
FIG. 11 is another side perspective view of the electrically and mechanically driven automotive accessory illustrated in FIG. 7, where the internal components of the electrically and mechanically driven automotive accessory are shown in dashed lines.

The stationary backing member 62, the rotor body 112, the claw body 113, and the pulley 28 are all made of a magnetic material, such as a ferrous metal material. As best seen in FIG. 6, when electricity (i.e., electric current) is applied to wire coil 126, the electromagnet 108 of the pulley assist mechanism 30 induces a magnetic loop 128 in the circumferentially spaced teeth 110 of the rotor body 112 and in portions of the stationary backing member 62, the pulley 28, the rotor body 112, and the claw body 113. When the electromagnet 108 of the pulley assist mechanism 30 is deactivated (i.e., de-energized), the magnetic coupling between the pulley 28 and the rotor body 112 ends. As a result, there is no torque transfer between the pulley 28 and the rotor body 112 when the electromagnet 108 is deactivated. However, when the electromagnet 108 of the pulley assist mechanism 30 is activated (i.e., energized), the magnetic field induced between the pulley 28, the claw body 113, and the circumferentially spaced teeth 110 of the rotor body 112 results in torque transfer between the pulley 28 and the rotor body 112.

There are a number of predetermined tolerances (i.e., small gaps) between an outer edge 120 of the stationary backing member 62 and the inner diameter face 136 of the rotor body 112, between the radial portion 144 of the claw body 113 and the first set of teeth 110a of the rotor body 112, and between the longitudinal portion 146 of the claw body 113 and the second set of teeth 110b of the rotor body 112. These tolerances must be small enough to provide a relatively uninterrupted magnetic loop 128 when the electromagnet 108 is activated, but large enough to accommodate manufacturing tolerances and permit relative motion between the rotor body 112 and the claw body 113 and relative motion between the rotor body 112 and the stationary backing member 62. By way of example and without limitation, these predetermined tolerances may be 100-200 microns (μm) and preferably about 150 microns (μm).

The circumferentially spaced teeth 110 and the rotor body 112 are made of a first material 150 while the conductive body 111 is made of a second material 152. The first material 150 is ferromagnetic and has a higher magnetic flux density than the second material 152. By way of example and without limitation, the first material 150 may be steel. The second material 152 has a higher electrical conductivity than the first material 150. By way of example and without limitation, the second material 152 may be aluminum or copper. The claw body 113 is also made of a ferromagnetic material, such as steel. This results in a structure where the circumferentially spaced teeth 110 of the rotor body 112 have a higher flux density while the conductive body 111 has a higher electrical conductivity and less weight.

As explained above, when the electromagnet 108 is energized a magnetic loop 128 is created that extends through the circumferentially spaced teeth 110 of the rotor body 112, the stationary backing member 62, the pulley 28, and the claw body 113. When the pulley 28 and the claw body 113 rotate at a different speed than the rotor body 112 while the electromagnet 108 is energized, the circumferentially spaced slots 148 generate a change in magnetic flux in the circumferentially spaced teeth 110 as the slots 148 pass over the teeth 110. This creates fluctuating/alternating magnetic poles (e.g., alternating di-poles) in the circumferentially spaced teeth 110 and induces electric currents in the conductive body 111. The induced electric currents in the conductive body 111 flow around the circumferentially spaced teeth 110, creating a secondary magnetic field that resists relative motion between the rotor body 112 and the pulley 28/claw body 113, which ultimately results in torque transfer and thus a secondary torque flow path between the pulley 28 and the rotor body 112, which is connected to the shaft 26.

The magnetic coupling between the pulley 28 and the rotor body 112, requires relative motion between the pulley 28 and rotor body 112. Accordingly, there will always be some rotational slip between the pulley 28 and the rotor body 112, even when the electromagnet 108 is activated. The electromagnet 108 of the pulley assist mechanism 30 is only activated when the belt is driving the pulley 28 at a faster rotational speed than the rotational speed that the rotating assembly 60 is being driven at via the primary torque flow path produced by the electric motor 24. When the electromagnet 108 is activated in such conditions, the secondary torque flow path provided by the pulley assist mechanism 30 (i.e., the induced magnetic coupling between the pulley 28 and the rotor body 112) adds to the primary torque flow path produced by the electric motor 24, which allows the rotating assembly 60 and therefore the shaft 26 to be driven at a higher rotational speed (i.e., higher revolutions per minute/RPMs) than would be possible when utilizing only the primary torque flow path. As a result, the fluid flow generated by the impeller 54 is increased. Additionally, the electric current supplied to the electrical windings 68 of the stator assembly 58 can be reduced for any given rotational speed when the electromagnet 108 of the pulley assist mechanism 30 is activated.

In many cases, the pulley assist mechanism 30 also allows the electric motor 24 to be downsized because peak pump demand usually coincides with high engine speeds, where the rotational speed of the pulley 28 is high and the pulley assist mechanism 30 is most effective (i.e., when the pulley assist mechanism 30 can provide the largest increase in rotational speed to the rotating assembly 60). As explained below, the electromagnet 108 of the pulley assist mechanism 30 is deactivated when the primary torque flow path of the electric motor 24 is driving the rotating assembly 60 at a rotational speed that is faster than the rotational speed of the pulley 28. If the electromagnet 108 were not deactivated during such conditions, the pulley assist mechanism 30 would slow the rotation of the rotating assembly 60 and act as a brake, which would be undesirable in most applications.

Unlike mechanically driven automotive accessories, the electrically and mechanically driven automotive accessory 20 described herein can be driven by just the electric motor 24 when the engine of the vehicle is not running. Additionally, the rotational speed of the shaft 26 is fully variable and can be controlled independently of the speed of the engine. The electric current applied to the wire coil 126 of the electromagnet 108 can be controlled to vary the degree of magnetic coupling between the pulley 28 and the rotor body 112. As a result, the amount of torque transfer between the pulley 28 and the rotor body 112 can be adjusted to control the rotational speed of the shaft 26 as well as the amount of mechanical drag the pulley 28 places on the engine of the vehicle. In other words, the amount of load the electrically and mechanically driven automotive accessory 20 places on the engine can be controlled in view of the engine's speed, power output, fuel economy, and/or other operating parameters.

FIGS. 7-12 illustrate another electrically and mechanically driven automotive accessory 20', with a pulley assist mechanism 30' of an alternative configuration that does not include the claw body 113 shown in FIGS. 1-6. Many of the elements of the electrically and mechanically driven automotive accessory 20' shown in FIGS. 7-12 are the same as the elements of the electrically and mechanically driven automotive accessory 20 shown in FIGS. 1-6 and therefore share the same reference numbers, except that a prime (') annotation has been appended after the reference numbers in FIGS. 7-12.

The electrically and mechanically driven automotive accessory 20' shown in FIGS. 7-12 includes a housing 22' that has a tubular portion 32' and a flange portion 34'. The tubular portion 32' extends annularly about a longitudinal axis 36' between a first housing end 38' and a second housing end 40'. The flange portion 34' attaches to the tubular portion 32' at the second housing end 40'. A shaft 26' is received co-axially inside the tubular portion 32' of the housing 22'. The shaft 26' extends along the longitudinal axis 36' between an input end 42' and an output end 44'.

The electrically and mechanically driven automotive accessory 20' includes an electric motor 24' that again is configured to create a primary torque flow path for driving rotation of the shaft 26' when the electric motor 24' is activated. The electric motor 24' illustrated in FIGS. 7-12 comprises a stator assembly 58' and a rotating assembly 60'. The stator assembly 58' is fixedly mounted inside the tubular portion 32' of the housing 22' and therefore remains stationary during operation. The stator assembly 58' includes a plurality of stator plates 64', which are fixedly mounted inside the tubular portion 32' of the housing 22'. The stator plates 64' are stacked together, define a central opening 65', and include a plurality of arms 66' that support electrical windings 68'.

The rotating assembly 60' is positioned inside the central opening 65' of the stator assembly 58', is rotatable relative to the stator assembly 58' about the longitudinal axis 36', and includes a rotating backing member 80' that is fixedly mounted to the shaft 26' such that the rotating backing member 80' rotates with the shaft 26'. It should be appreciated that the words "stationary" and "rotating" used to describe the backing members 62', 80' of the electric motor 24' are merely used for labelling purposes and refer to the relative motion between these two components when the electric motor 24' is running. Permanent magnets 82' are fixedly mounted to the rotating backing member 80' and are spaced radially inward of the stator plates 64'. When electricity (i.e., electric current) is applied to the electrical windings 68' of the stator assembly 58', an electromagnetic field is created that interacts with the magnetic field of the permanent magnets 82', which causes the rotating backing member 80' to rotate. The rotating backing member 80' is fixed to the shaft 26' such that the electric motor 24' rotationally drives the shaft 26' when electricity is applied to the electrical windings 68' of the stator assembly 58'.

The electrically and mechanically driven automotive accessory 20' includes a pulley 28' with a pulley wall 88' and the pulley assist mechanism 30' includes an electromagnet 108', a plurality of circumferentially spaced teeth 110' that protrude longitudinally from an inboard face 94' of the pulley wall 88' at a first height H1', a conductive body 111', and a rotor body 112'. The electromagnet 108' includes a wire coil 126' that is supported by a bobbin 127'. The bobbin 127' is fixedly attached to the stationary backing member 62'. The plurality of circumferentially spaced teeth 110' are nested with a conductive body 111'. The plurality of circumferentially spaced teeth 110' extend lengthwise in a plurality of radial directions (i.e., in directions transverse to the longitudinal axis 36'). The circumferentially spaced teeth 110' extend into a plurality of openings 142' in the conductive body 111'. As a result, the features of the conductive body 111' nest with the features of the pulley 28'. However, it should be appreciated that the openings 142' in the conductive body 111' may or may not extend entirely through the conductive body 111' and therefore may be open on one side and closed on the other. Both the circumferentially spaced teeth 110' and the conductive body 111' are fixed to the pulley 28'. For example, as shown in FIGS. 7-12, the circumferentially spaced teeth 110' are integral with the pulley wall 88' and the conductive body 111' is press fit onto the pulley 28' over the teeth 110'.

The pulley assist mechanism 30' also includes a rotor body 112' that is fixedly mounted to the shaft 26'. As a result, the rotor body 112' always rotates at the same rotational speed as the shaft 26' and therefore the rotating assembly 60' of the electric motor 24', while the conductive body 111' always rotates at the same rotational speed as the pulley 28', which may be different than the rotational speed of the shaft 26' and the rotating assembly 60' of the electric motor 24'. The rotor body 112' is positioned between the pulley 28' and a stationary backing member 62', which is fixedly mounted to the tubular portion 32' at the first housing end 38'. The rotor body 112' includes a radial portion 144' that extends radially outwardly from the shaft 26 to a longitudinal portion 146'. The radial portion 144' of the rotor body 112' includes a first side face 138' that faces the pulley 28' and a second side face 140' opposite the first side face 138'. The rotor body 112' includes a plurality of circumferentially spaced ribs 148' that protrude longitudinally from first side face 138' of the rotor body 112' at a second height H2' and extend lengthwise in a plurality of radial directions (i.e., in directions transverse to the longitudinal axis 36').

Figure 12:
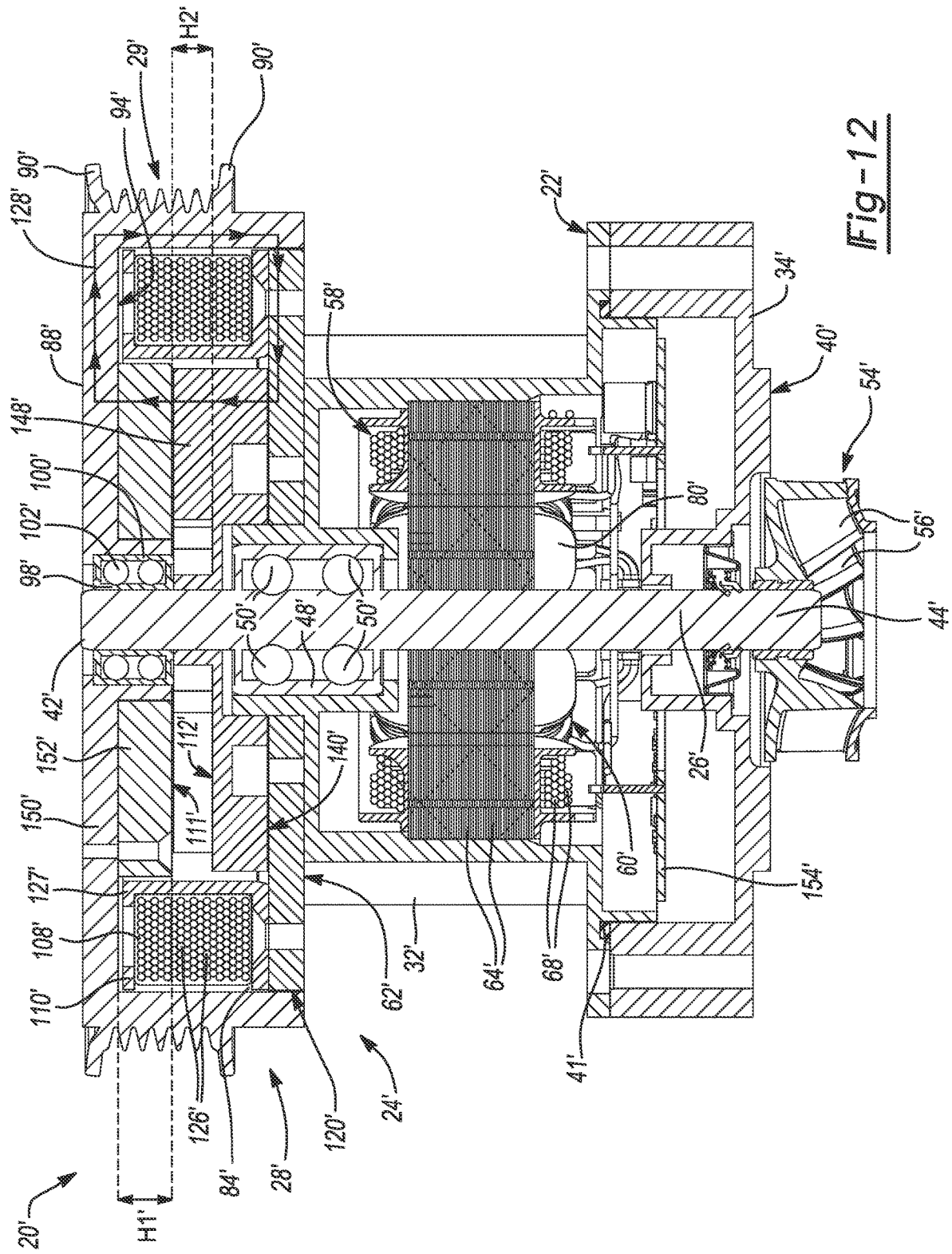
FIG. 12 is a side cross-sectional view of the electrically and mechanically driven automotive accessory illustrated in FIG. 7.

As best seen in FIG. 12, when electricity (i.e., electric current) is applied to wire coil 126', an electromagnet 108' of the pulley assist mechanism 30' induces a magnetic loop 128' in the circumferentially spaced teeth 110' and in portions of the stationary backing member 62', the pulley 28', the circumferentially spaced ribs 148', and the rotor body 112'. When the electromagnet 108' of the pulley assist mechanism 30' is deactivated (i.e., de-energized), the magnetic coupling between the pulley 28' and the rotor body 112' ends. As a result, there is no torque transfer between the pulley 28' and the rotor body 112' when the electromagnet 108' is deactivated. However, when the electromagnet 108' of the pulley assist mechanism 30' is activated (i.e., energized), the magnetic field induced between the pulley 28' and the rotor body 112' results in torque transfer between the pulley 28' and the rotor body 112'.

There are a number of predetermined tolerances (i.e., small gaps) between an outer edge 120' of the stationary backing member 62' and the pulley 28', between the second side face 140' of the rotor body 112' and the stationary backing member 62', and between the circumferentially spaced teeth 110' of the pulley 28' and the circumferentially spaced ribs 148' of the rotor body 112'. These tolerances must be small enough to provide a relatively uninterrupted magnetic loop 128' when the electromagnet 108' is activated, but large enough to accommodate manufacturing tolerances and permit relative motion between the rotor body 112' and the pulley 28' and relative motion between the rotor body 112' and the stationary backing member 62'. By way of example and without limitation, these predetermined tolerances may be 100-200 microns (μm) and preferably about 150 microns (μm).

The circumferentially spaced teeth 110' and the pulley 28' are made of a first material 150' while the conductive body 111' is made of a second material 152'. The first material 150' is ferromagnetic and has a higher magnetic flux density than the second material 152'. By way of example and without limitation, the first material 150' may be steel. The second material 152' has a higher electrical conductivity than the first material 150'. By way of example and without limitation, the second material 152' may be aluminum or copper. The rotor body 112' and the circumferentially spaced ribs 148' are also made of a ferromagnetic material, such as steel. This results in a structure where the circumferentially spaced teeth 110' of the pulley 28' have a higher flux density while the conductive body 111' has a higher electrical conductivity and less weight.

When the pulley 28' rotates at a different speed than the rotor body 112' while the electromagnet 108' is energized, the circumferentially spaced ribs 148' generate a change in magnetic flux in the circumferentially spaced teeth 110' as the ribs 148' pass over the teeth 110'. This creates fluctuating/alternating magnetic poles (e.g., alternating di-poles) in the circumferentially spaced teeth 110' and induces electric currents in the conductive body 111'. The induced electric currents in the conductive body 111' flow around the circumferentially spaced teeth 110', creating a secondary magnetic field that resists relative motion between the rotor body 112' and the pulley 28', which ultimately results in torque transfer and thus a secondary torque flow path between the pulley 28' and the rotor body 112', which is connected to the shaft 26'.

FIGS. 13 and 14 illustrate another electrically and mechanically driven automotive accessory 20", with a pulley assist mechanism 30" of an alternative configuration that again does not include the claw body 113 shown in FIGS. 1-6. Many of the elements of the electrically and mechanically driven automotive accessory 20" shown in FIGS. 7-12 are the same as the elements of the electrically and mechanically driven automotive accessory 20' shown in FIGS. 7-12 and therefore share the same reference numbers, except that a double prime (") annotation has been appended after the reference numbers in FIGS. 13 and 14.

In the arrangement shown in FIGS. 13 and 14, the pulley assist mechanism 30" is nearly identical to the pulley assist mechanism 30' shown in FIGS. 7-12, except that the pulley assist mechanism 30" shown in FIGS. 13 and 14 contains a conductive body 111" that is fixed to rotor body 112" instead of pulley 28". As a result, the pulley assist mechanism 30" includes a plurality of circumferentially spaced teeth 110" that protrude longitudinally from a first side face 138" of the rotor body 112" at a first height H1" and a plurality of circumferentially spaced ribs 148" protrude longitudinally from an inboard face 94" of the pulley wall 88" at a second height H2". The circumferentially spaced teeth 110" extend through a plurality of openings 142" in the conductive body 111". As a result, the features of the conductive body 111" nest with the features of the rotor body 112". Both the circumferentially spaced teeth 110" and the conductive body 111" are fixed to the rotor body 112" instead of the pulley 28" in this embodiment. For example, as shown in FIGS. 13 and 14, the circumferentially spaced teeth 110" are integral with the rotor body 112" and the conductive body 111" is press fit onto the rotor body 112" over the teeth 110". Notwithstanding these structural differences, the pulley assist mechanism 30" shown in FIGS. 13 and 14 operates the same way as the pulley assist mechanism 30' shown in FIGS. 7-12.

The electrically and mechanically driven automotive accessories 20, 20', 20" described above can be controlled according to the method of operation set forth below. The method includes the step of applying electricity to the electrical windings 68, 68', 68" of the stator assembly 58, 58', 58" to generate an electromagnetic field and a primary torque flow path that rotationally drives the rotating assembly 60, 60', 60", and thus, the shaft 26, 26', 26". The method also includes the step of rotationally driving the pulley 28, 28', 28", which is rotatably supported on the pulley bearing assembly 96, 96', 96". The method proceeds with the steps of detecting a first rotational speed of the rotating assembly 60, 60', 60" and/or the shaft 26, 26', 26" and detecting a second rotational speed of the pulley 28, 28', 28". The electrically and mechanically driven automotive accessories 20, 20', 20" may optionally include one or more sensors (not shown) that are configured to measure/read the first rotational speed of the rotating assembly 60, 60', 60" and/or the shaft 26, 26', 26" and the second rotational speed of the pulley 28, 28', 28". Alternately, the first rotational speed of the rotating assembly 60, 60', 60" and/or the shaft 26, 26', 26" and the second rotational speed of the pulley 28, 28', 28" can be determined based on the electric and magnetic fields (EMF) of the electric motor 24, 24', 24". The method further includes the step of activating the pulley assist mechanism 30, 30', 30" when the second rotational speed (i.e., the rotational speed of the pulley 28, 28', 28") is greater than the first rotational speed (i.e., the rotational speed of the rotating assembly 60, 60', 60"/shaft 26, 26', 26"). This step includes applying electricity to the electromagnet 108, 108', 108" to induce a magnetic field between the pulley 28, 28', 28", the circumferentially spaced teeth 110, 110', 110", and the rotor body 112, 112', 112" to create a secondary torque flow path between the pulley 28, 28', 28'" and the rotor body 112, 112', 112". The step of activating the pulley assist mechanism 30, 30', 30" produces the magnetic loops 128, 128', 128" described above, which extend around the electromagnet 108, 108', 108" through the circumferentially spaced teeth 110, 110', 110" and portions of the rotor body 112, 112', 112", the stationary backing member 62, 62', 62", and the pulley 28, 28', 28". The method may also include the step of deactivating the pulley assist mechanism 30, 30', 30" when the first rotational speed (i.e., the rotational speed of the rotating assembly 60, 60', 60"/shaft 26, 26', 26") is greater than the second rotational speed (i.e., the rotational speed of the pulley 28, 28', 28"). The steps of activating and deactivating the pulley assist mechanism 30, 30', 30" may be performed by a controller/ECU 154, 154', 154" adapted to control the output of one or more electric power supplies (not shown), which may be electrically connected to the wire coil 126, 126', 126" of the electromagnetic and/or the electrical windings 68, 68', 68" of the stator assembly stator assembly 58, 58', 58".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims. In addition, the steps of the method set forth herein may be practiced in a different order than that listed herein without departing from the scope of the appended claims.

What is claimed is:

1. An electrically and mechanically driven automotive accessory, comprising:
   a housing;
   a shaft rotatably supported in said housing, said shaft extending along a longitudinal axis between an input end and an output end;
   an electric motor comprising a stator assembly and a rotating assembly that is rotatable relative to said stator assembly, said electric motor being configured to create a primary torque flow path when said electric motor is activated;
   said stator assembly fixedly mounted to said housing;
   said rotating assembly fixedly mounted to said shaft such that said rotating assembly rotates with said shaft;

a pulley rotatably supported on said input end of said shaft such that said pulley is rotatable relative to said shaft and said rotating assembly; and a pulley assist mechanism including a plurality of circumferentially spaced teeth nested with a conductive body, a rotor body fixedly mounted to said shaft, and an electromagnet configured to induce a magnetic field between said circumferentially spaced teeth, said rotor body, and said pulley to create a secondary torque flow path between said pulley and said rotor body when said electromagnet is activated, wherein said conductive body is fixed to said rotor body and wherein said circumferentially spaced teeth are part of said rotor body and extend into a plurality of openings in said conductive body.

2. The electrically and mechanically driven automotive accessory set forth in claim 1, further comprising:

a claw body positioned between said pulley and said rotor body, wherein said claw body is fixed to said pulley and includes a plurality of circumferentially spaced slots that generate a change in magnetic flux in said circumferentially spaced teeth and induce electric current in said conductive body when said claw body and pulley rotate at a different speed than said rotor body.

3. The electrically and mechanically driven automotive accessory set forth in claim 2, wherein said plurality of circumferentially spaced teeth include a first set of teeth that extend lengthwise in a plurality of radial directions transverse to said longitudinal axis and a second set of teeth that extend lengthwise in a plurality of longitudinal directions parallel to said longitudinal axis and wherein each slot in said plurality of circumferentially spaced slots has a radial component that is transverse to said longitudinal axis and a longitudinal component that is parallel to and spaced from said longitudinal axis.

4. The electrically and mechanically driven automotive accessory set forth in claim 1, wherein said pulley includes a plurality of circumferentially spaced ribs that generate a change in magnetic flux in said circumferentially spaced teeth and induce electric current in said conductive body when said pulley rotates at a different speed than said rotor body.

* * * * *